No. 761,505. PATENTED MAY 31, 1904.
B. D. KNICKERBOCKER.
FAUCET CONNECTION.
APPLICATION FILED MAR. 3, 1902.
NO MODEL.
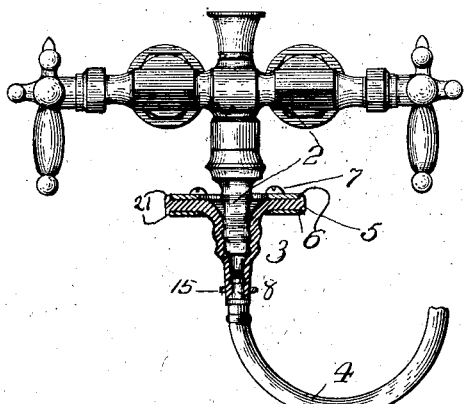
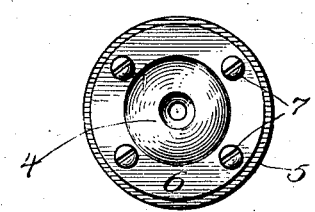
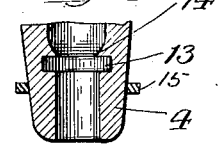
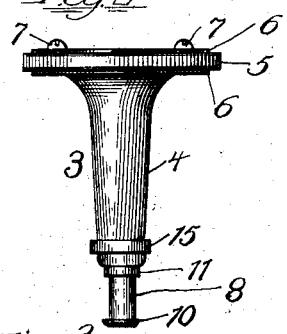
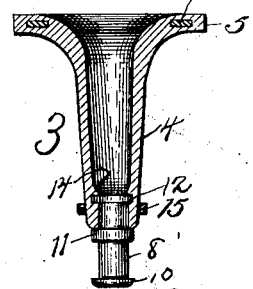
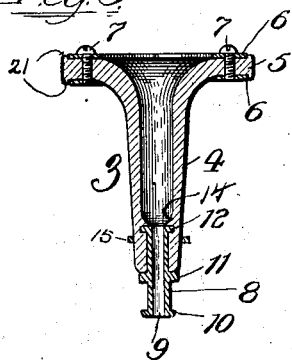
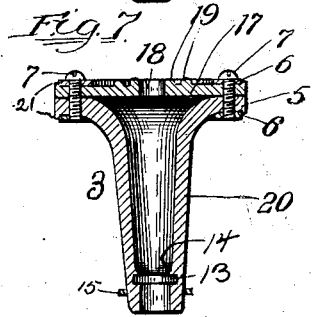
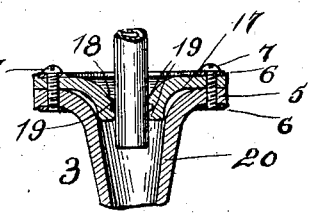
Witnesses:
R. W. Ashley.
Robert Lewis Ames.
Inventor:
Burton D. Knickerbocker
By Jones & Addington
Attorneys.

No. 761,505.

Patented May 31, 1904.

UNITED STATES PATENT OFFICE.

BURTON D. KNICKERBOCKER, OF CHICAGO, ILLINOIS, ASSIGNOR TO KNICKERBOCKER MFG. COMPANY, OF CHICAGO, ILLINOIS, A CORPORATION OF ILLINOIS.

FAUCET CONNECTION.

SPECIFICATION forming part of Letters Patent No. 761,505, dated May 31, 1904.

Application filed March 3, 1902. Serial No. 96,551. (No model.)

*To all whom it may concern:*

Be it known that I, BURTON D. KNICKERBOCKER, a citizen of the United States, residing at Chicago, in the county of Cook and State of Illinois, have invented a certain new and useful Improvement in Faucet Connections, of which the following is a full, clear, concise, and exact description, reference being had to the accompanying drawings, forming a part of this specification.

My invention relates to a faucet connection intended for use in connecting flexible or other tubes to the nozzle of a faucet. Heretofore such tubes have been directly connected to the nozzle of the faucet; but such an arrangement is objectionable for several reasons. In the first place it is a difficult and annoying operation to affix the end of the flexible tube to the nozzle, and in the second place the tube is soon distended to such an extent as to cause it to fail to grip the nozzle with sufficient force to maintain it in position, and besides it is often split open, so as to prevent its being secured to the faucet at all.

My invention has for its object the provision of simple and efficient means whereby the above-mentioned objections are overcome and many other advantages are secured; and it consists of a hollow body having flexible side walls adapted to grip the nozzle of the faucet when forced in position thereon and provided with a comparatively inflexible or rigid rim to support and sustain the flexible side walls as well as to permit the placing of the device upon the faucet and its removal therefrom. In its commercial form it comprises an india-rubber tubular body, the side walls of which are adapted by their elasticity to firmly grip the nozzle when the same is extended thereinto. A reinforced rim is provided for the body, such reinforcement being accomplished in any desired manner, but preferably by means of metallic rings placed either upon the outside of the rim or molded within the same, whereby the material near the rim and the upper part of the tubular portion is sustained and caused to more firmly grip the nozzle of the faucet and whereby a firm and rigid portion is provided which may be grasped by the hand when placing the same upon or removing it from the faucet. The flexibility of the side walls permits the connecting device to be applied to a variety of sizes of nozzles. The details of construction are explained in connection with the accompanying drawings, in which the same reference characters are used throughout the several views, and in which—

Figure 1 shows the device applied to a combined hot and cold water faucet of ordinary construction, the connection itself being shown in section. Fig. 2 is an elevation of the device. Fig. 3 is a vertical section through the same. Fig. 4 is a plan view thereof. Fig. 5 is a detail view, on an enlarged scale, of the lower end of the device. Fig. 6 is a sectional view showing a modification of the rim-reinforcing device. Fig. 7 is a sectional view of a different form of the invention, and Fig. 8 is a sectional view showing the last-mentioned form in position.

In the figures, 2 designates the nozzle of an ordinary combined hot and cold water faucet.

3 is the faucet connection of my invention, and 4 is the rubber tube with which the faucet connection is designed to be permanently connected, this tube leading to any desired device, such a spraying-nozzle, bath-brush, or other desirable apparatus. As shown more clearly in Fig. 3, the connection 3 comprises the tubular portion 4, which, as stated above, is constructed of india-rubber, having an outwardly-extending rim 5 at its upper end, the thickness of the material gradually increasing from the lower part of the body portion to the edge of the rim, and the junction between the said tubular portion and rim being of funnel form, as shown in this figure, to more readily permit the insertion and gripping of the faucet-nozzle. Upon the upper and lower sides of the rim 5 metallic rings 6 are provided, which are firmly secured together and to the rim by means of screws 7, although other fastening devices may be employed. This reinforcement may be accomplished by means of hard-rubber rings or in other suitable manner.

To prevent the rubber pulling from between the rings 6 when placed under strain, as in placing the device upon the faucet or in removing it, a bead 21 is formed thereon which tends to prevent this.

Within the lower end of the tubular portion 4 a metallic tip 8 is provided, such tube having a central passage 9, and upon the lower end of which the flexible tube 4 is adapted to be secured. A raised rim 10 upon the lower end serves to prevent the tube from easily slipping off, while of course the end of the tube may be suitably cemented to the tip 8 or secured thereto by binding the same in place. Ordinarily, however, it will be sufficient to merely slip the tube over the end of the tip. A flange 11 is provided upon the tip, against which the lower end of the tube 4 rests. An additional flange 12 is provided upon the upper end of the said tip, which is placed in a suitable groove 13, formed in the rubber tube 4. An annular lip 14, Fig. 5, is formed upon the inside of the tube and rests upon the flange 12, whereby when the water is drawn out its pressure will force the lip tightly against the shoulder 12, and thereby form an air and water tight joint between them. To further insure a water and air tight connection between the tip and the lower end of the rubber tube, a metallic ring 15 may be slipped over the outside of the tube, said ring taking a position adjacent the lower edge of the flange 12, whereby the material of the tube is conveniently prevented from expanding and separating from the material of the tip 8. This ring of course may be applied to any of the modifications shown and described, and so far as some features and forms of the invention are concerned may be entirely omitted.

In Fig. 6 a modification is shown in the matter of the reinforcement of the rim 5, such modification consisting in molding the metallic ring, such as 16, in the material of the rim. The remainder of the construction of this form is the same as shown in Figs. 1 to 5, and is not, therefore, specifically described.

Fig. 7 shows a form in which the lower part of the tubular portion is not intended to grip the nozzle of the faucet, but instead a rubber disk 17 is provided at the upper end of the body, which is provided with a central aperture 18 of a size to firmly grip the nozzle of the faucet when the same is inserted therein. Suitably raised or thickened rims or ridges 19 serve to reinforce the material at the edge of the aperture 18, whereby it is strengthened and caused to more firmly grip the faucet, and which is shown in Fig. 8, are as suckers to cause the device to stick to the nozzle, which in this form is shown smooth, although the same action would take place with the corrugated nozzle. The body portion 20 of this form of the invention is preferably of greater diameter than that shown in the other figures and is connected at its rim 5 with the edge of the disk 17 by means of the rings 6 and screw 7. So far as this particular form of connection between the disk and body is concerned the two parts may be connected integrally with each other, but for convenience in manipulation I prefer to construct them as shown in Fig. 7. It will be understood that a nipple or tip, such as is shown in the other figures, is applied to the lower end of this form of the device.

In the operation of the invention the device is grasped by the rim or beneath the rim and slipped over the nozzle of the faucet. The rigidity of the rim permits accomplishing this operation with ease. The nozzle of the faucet distends the flexible walls of the device, which are supported by the inflexible rim to such an extent as to assist their elasticity and cause them to firmly grip the said nozzle. Moreover, the action of the flowing water within the hollow body seems to cause a vacuum therein, whereby the side walls more firmly grip the said faucet. The pressure of the water within the body causes the projecting lip or rib 14 to firmly press upon the flange 12 of the tip 8 and form a water and air tight connection therewith. The device may be readily removed from the faucet by taking hold of the rigid rim, which thus provides a simple and ready method of handling the same. In the case of the form shown in Fig. 7 the operation is the same, the nozzle of the faucet being grasped by the flexible side walls of the aperture 18. In this form the enlarged aperture in the body 20 permits the flexible disk 17 to bend down thereinto.

Although I have described the construction of the device as deemed best at present for commercial purposes, it is apparent that the details of construction may be changed in many respects, and I therefore do not wish to be limited in all respects to such details.

Having described my invention, what I claim as new, and desire to secure by Letters Patent, is—

1. A faucet connection of india-rubber consisting of a tubular portion with which the nozzle of a faucet is adapted to be connected, a metallic tip for the lower end of said tubular portion, said tip having a flange adapted to fit within a suitable groove formed within the tubular portion and a thin lip or rim formed upon the interior of said tubular portion and resting upon the upper edge of said flange whereby the pressure of the water within the tubular portion causes a water and air tight connection between said lip and flange, substantially as described.

2. A faucet connection of india-rubber having a tubular portion, and a thickened rim at its upper end, the walls of said tubular portion and rim uniformly increasing in thickness from the lower end of said portion to the outer edge of said rim, and the connection between the rim and portion being rounded or of funnel form, metallic rings placed upon both sides of the said rim, means passing through said rings to cause them to firmly grip the said rim, a metallic tip for the lower end of the tubular portion having a raised rib at its lower end over which the end of a flexible tube is adapted to be passed, a flange at its upper end adapted to fit within a groove formed within the walls of said tubular portion, and a thin lip or rib formed upon the inner walls of said tubular portion and resting upon the end of said tip and the flange to cause by the pressure of the water inside the tubular portion a tight joint between the tubular portion and metallic tip, substantially as described.

3. A faucet connection of india-rubber having a rim, a metallic ring secured to the outside of the rim to reinforce the same, and a bead formed upon the outer face of the rim at the edge of the ring, substantially as described.

4. A faucet connection comprising a tubular body portion composed of elastic material formed to receive the faucet, and a flange extending outwardly beyond the walls of said tubular body portion near the upper end thereof.

5. A faucet connection comprising a tubular body portion composed of elastic material formed to receive the faucet, a flange extending outwardly beyond the walls of said tubular body portion near the upper end thereof, and rigidly reinforced at its outer edge.

6. A faucet connection comprising a tubular body portion composed of elastic material adapted to make connection with the faucet, a flange extending outwardly beyond the walls of said tubular body portion, and rigid reinforcing-strips secured to said flange.

7. A faucet connection comprising a tubular body portion composed of elastic material adapted to make connection with the faucet, a flange extending outwardly beyond the walls of said tubular body portion, and a plate secured to said flange to make the same firm.

8. A faucet connection comprising a tubular body portion composed of elastic material adapted to make connection with the faucet, a flange extending outwardly beyond the walls of said tubular body portion, and a plate arranged upon each side of said flange to make the same firm.

9. A faucet connection comprising a tubular body portion composed of elastic material adapted to make connection with the faucet, a flange extending outwardly beyond the walls of said tubular body portion, metallic strips arranged upon each side of said flange to make the same rigid and pins connecting said strips to secure the same in position.

10. A faucet connection comprising a tubular body portion composed of elastic material adapted to make connection with the faucet, a flange extending outwardly beyond the walls of said tubular body portion, and annular plates secured on each side of said flange to make the same rigid.

11. A faucet connection comprising a tubular body portion composed of elastic material formed to receive the faucet, a flange extending outwardly beyond said tubular body portion near the upper end thereof, and means for gripping the faucet when thrust into said tube.

12. A faucet connection comprising a tubular body portion composed of elastic material formed to receive the faucet and tapered toward one end, a flange extending outwardly from said tubular body portion near the upper end thereof and rigidly reinforced at its outer edge.

13. A faucet connection comprising a tubular body portion of elastic material, and a tip of rigid material, said tip and body portion each having a shoulder formed thereon which is arranged to engage the other shoulder to prevent the detachment of said tip from the tubular body portion, substantially as described.

14. A faucet connection comprising a tubular body portion of elastic material having a shoulder formed on the interior thereof, and a tip of rigid material inserted within said tubular body portion and having a shoulder which engages the shoulder on said tubular body portion, said shoulders being arranged to prevent the withdrawal of said tip from said tubular body portion, substantially as described.

15. A faucet connection comprising a tubular body portion of elastic material having a shoulder formed on the interior thereof, a tip inserted within said tubular body portion and having a shoulder which engages the first-mentioned shoulder and prevents the withdrawal of said tip from said tubular body portion, and a band surrrounding said tubular body portion to prevent the spreading thereof at the point where the said shoulders engage, substantially as described.

16. A faucet connection comprising a tubular body portion of elastic material having a shoulder formed on the interior thereof, a tip inserted within said tubular body portion and having a shoulder which engages the first-mentioned shoulder to prevent the withdrawal of said tip from said tubular body portion, and a lip formed on the interior of said tubular body portion which rests upon the inner end of said tip, substantially as described.

17. A faucet connection of india-rubber having a rim, a metallic ring secured upon each side of the said rim to reinforce the same, and a bead formed upon the outer faces of the rim at the edges of the rings, substantially as described.

In witness whereof I have hereunto subscribed my name in the presence of two witnesses.

BURTON D. KNICKERBOCKER.

Witnesses:
M. R. ROCHFORD,
W. CLYDE JONES.